A. L. SESSIONS.
SHEET METAL STRUCTURE.
APPLICATION FILED JUNE 16, 1909.

1,056,222.

Patented Mar. 18, 1913.

Witnesses:
F. H. Elliott
L. E. Berkovich

Inventor:
Albert L. Sessions.
by Arthur B. Jenkins
Attorney.

UNITED STATES PATENT OFFICE.

ALBERT L. SESSIONS, OF BRISTOL, CONNECTICUT.

SHEET-METAL STRUCTURE.

1,056,222. Specification of Letters Patent. Patented Mar. 18, 1913.

Application filed June 16, 1909. Serial No. 502,448.

*To all whom it may concern:*

Be it known that I, ALBERT L. SESSIONS, a citizen of the United States, and a resident of Bristol, in the county of Hartford and State of Connecticut, have invented a new and Improved Sheet-Metal Structure, of which the following is a specification.

My invention relates to the class of devices formed from thin metal, preferably sheet metal, and which are employed as a means for attachment of various devices, and the object of the invention, among others, is to provide a device of this class that while containing a minimum amount of metal shall at the same time be sufficiently strong for all the purposes intended and shall have the necessary thickness at the points where such thickness is required.

One form of device in the use of which these objects may be attained is illustrated in the accompanying drawings, in which—

Figure 1:
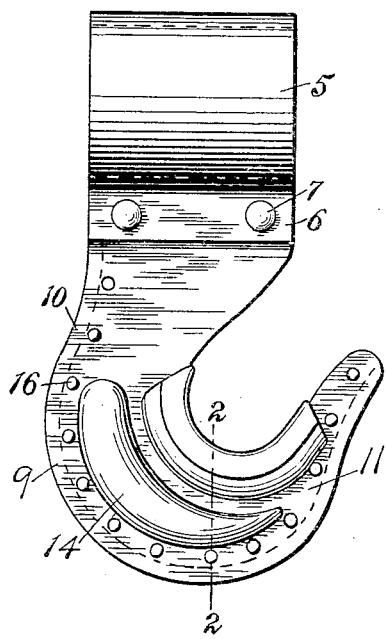
Figure 2:
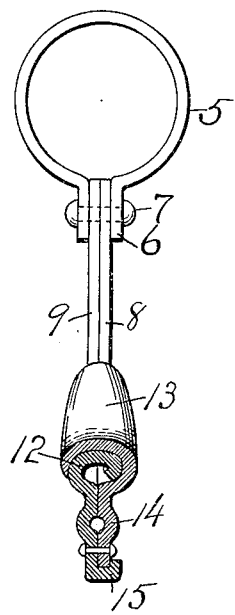
Figure 3:
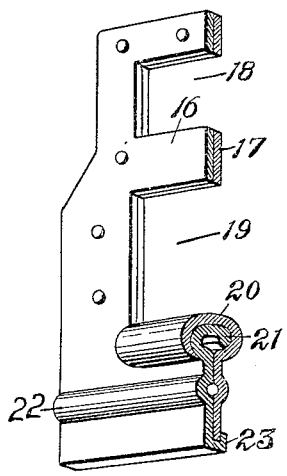

Figure 1 is a side view of a hook embodying my invention. Fig. 2 is a view in section through the hook on plane denoted by dotted line 2—2 of Fig. 1. Fig. 3 is a perspective view in section through a harness loop showing the invention as applied thereto.

I contemplate the embodiment of my invention in various forms of structures made from thin metal, preferably sheet metal, and as it finds ready application to a hook commonly used for the attachment of the trace of a harness and also in a metal loop used in harness construction, I have selected such devices for the purpose of illustration and description herein, but it will be understood that the invention is not limited to use in such structures.

In the accompanying drawings the numeral 5 denotes a socket composed of thin metal shaped as a loop preferably of circular form and having lips 6 located at the meeting portions of the socket. The plates composing the hook or other structure are secured between these lips 6 as by means of rivets 7 or other suitable securing means. The hook is formed of two pieces 8—9 composed of thin metal placed closely against each other, this hook as a whole having the shank 10 and a hook 11.

In order to provide the necessary thickness of hook at the inner curved edge thereof and which usually receives the part to be attached thereto projections are formed on the plates which it will be understood may be stamped or cut from the metal by means of dies or the like. One of these projections is bent into curved form extending outwardly from the plate and then backwardly, its edge extending preferably beyond the line of division between the two plates and forming the inner portion or lap 12 of the rim of the structure. Another projection is formed on the plate 8 which is also curved outwardly from the plate and then backwardly overlapping the edge 12 and forming the outer lap 13 of the rim. This rim may extend for any suitable distance along the edge of the hook to provide the necessary supporting and strengthening means. Each of the plates is also bent outwardly to form a rib 14 located between the inner and outer edges of the curve of the hook, the ribs on each plate being located one opposite the other. These ribs impart to the hook a stiffening element to provide for necessary rigidity of the structure. The outer edge of one of the plates as 9 is bent as at 15 to inclose the edge of the other plate as 8, and thus form a means for securing the two plates together along the edge, and as an additional means of securing the plates together if desired rivets 16 may be employed.

In Fig. 3 of the drawings I have shown the invention as applied to a fastening plate commonly used in harness construction, this plate consisting of two pieces 16—17 of thin metal, which plate has an opening 18 for the reception of a harness part and an opening 19 for the reception of another harness part, or strap. The outer edge of the opening 19 is provided with the same kind of a rim, as that shown in Figs. 1 and 2, the construction of which will be readily understood from the description hereinabove set forth, this opening 19 having outer and inner laps 20—21 and a rib 22. The lower edge of the plate 16 is bent around the edge of the plate 17 as shown at 23.

While I have shown and described herein one means of embodiment of the invention, it will be understood that this may be departed from to a greater or lesser extent, and I do not therefore limit myself to the exact construction herein shown and described.

The construction of the overlapping parts with the edge of one lapped underneath the other to lock the two together is not essential to the invention, as any means of securing the overlapped parts together is contemplated by me as within the invention. In fact, the rigidity of the parts may be such as to retain them in proper position in some forms of structure.

I claim—

1. An attaching device including two plates with substantially the entire surface of their flat sides secured one against the other and with a rim formed at an exposed edge of the structure and consisting of an extension from one plate overlapping an extension from the opposite plate to receive an attached member.

2. An attaching device including two plates with substantially the entire surface of their flat sides secured one against the other, said structure having a rim formed at one exposed edge thereof by a projection from one plate bent within and inclosed by a projection from the opposite plate, said rim being disposed to receive an attached member.

3. A hook formed from a plural number of thin plates secured with their flat sides one against the other, the inner curve of the hook having a roll formed by a projection from one plate bent over across the line of division of the two plates, and a projection from the opposite plate bent around to form the outer lap of said roll.

4. A hook including a plural number of plates secured with their flat sides one against the other, the inner curve of the hook having a roll formed by a projection from one plate bent over to form one lap of the roll and a projection from the other plate bent over to form the outer lap of the roll, and a lip at the opposite edge of the hook formed on one plate and inclosing the edge of the opposite plate.

5. A hook including a socket formed from a single piece of metal bent to loop form and having projecting lips on one side, a shank with its end located between and secured to said lips, and a roll formed on the inner curve of the hook by a projection from one plate bent to overlap a projection from another plate.

6. A hook including a socket formed from a single piece of metal bent into loop form and having lips on one side thereof, a shank with its end located between and secured to said lips, a roll on the inner curve of the hook consisting of overlapping projections from opposite plates bent one around the other, and a lip formed on a plate at the opposite edge of the hook bent around and inclosing the edge of the opposite plate.

7. An attaching device including a plural number of plates secured with substantially the entire surface of their flat faces one against the other, said structure having a roll formed at one exposed edge by a projection from one plate overlapping and inclosing a projection from the opposite plate, said roll being disposed to receive an attached member, and a plate at another edge of the structure bent around and inclosing the edge of the opposite plate.

8. An attaching device including two plates with substantially the entire surface of their flat sides secured one against the other and with a rim formed by a curved bent edge of one plate wholly inclosed and enveloped by and overlapping the bent edge from the other plate, said curved edges extending in opposite directions from the base to the edge.

9. An attaching device including two plates with substantially the entire surface of their flat sides secured one against the other, one of said plates being bent at its edge to form a roll and the other of said plates being bent to pass entirely around the bent portion of the other plate, completely inclosing it, said bends forming a bounding edge for the structure and extending in opposite directions from the base to the edge.

ALBERT L. SESSIONS.

Witnesses:
L. E. BERKOVITCH,
ARTHUR B. JENKINS.